United States Patent
Ridgway

[15] 3,662,806
[45] May 16, 1972

[54] AGITATOR FOR BELT CONVEYOR
[72] Inventor: Kenneth Ridgway, Reading, England
[73] Assignee: Fisons Limited, Suffolk, England
[22] Filed: June 4, 1970
[21] Appl. No.: 43,419

[30] Foreign Application Priority Data
June 13, 1969 Great Britain........................30,100/69

[52] U.S. Cl..................................................259/2, 259/104
[51] Int. Cl........................................................B01f 15/00
[58] Field of Search...............................259/1, 2, 12, 29, 54

[56] References Cited

UNITED STATES PATENTS

| | | | |
|---|---|---|---|
| 761,088 | 5/1904 | Meyer | 259/2 |
| 2,106,915 | 2/1938 | Martel | 259/2 X |
| 2,580,854 | 1/1952 | Sherman | 259/2 |
| 3,318,446 | 5/1967 | Grow | 259/2 |

*Primary Examiner*—Robert W. Jenkins
*Attorney*—Wenderoth, Lind & Ponack

[57] ABSTRACT

A machine for agitating (or for breaking up agglomerates in) a material, preferably a pharmaceutical composition, on a conveyor, comprising two rotors rotatable in the same sense and having inter-meshing pins, and a 'plough share' co-operating with the rotors to carry material off the conveyor and into the milling zone between the two rotors. A process of milling a material on a conveyor is also provided.

10 Claims, 3 Drawing Figures

INVENTOR
KENNETH RIDGWAY 3,662,806

AGITATOR FOR BELT CONVEYOR

This invention relates to a device for breaking up agglomerates of material on a conveyor.

In certain types of capsule filling machines a small quantity of powder is transferred from a rotating annular conveyor trough by means of a number of cylinder and piston units mounted to rotate about a vertical axis laterally displaced from the axis of rotation of the trough. In such machines, powder is fed into the rotating trough by a vibratory feeder to maintain a constant level. The vertical cylinders move round, dip into the powder under the action of a cam, thus causing some agglomeration of the powder remaining on the conveyor, pick up a standard quantity of powder and move round to a region where they are travelling over, and at the same speed as, the lower halves of the capsules which are carried by a chain conveyor belt. The pistons then push out the volumetrically determined quantity of powder into the capsules, which pass on to have their upper halves refitted and to be ejected from the machine.

It will be appreciated that the volumetric, and therefore the gravimetric, accuracy of the powder dispensing depends critically upon maintaining the powder in the annular trough at the correct level and in a uniform state. The level is normally maintained by scraper blades, but considerable trouble is experienced due to some powders agglomerating into spheres under the combined action of the rotation and scraping, and the plunging action of the cylinders.

According to the invention there is provided a device for the agitation, mixing, tumbling or milling of a powder, particulate or granular material or for breaking up agglomerations of powder, particulate or granular material, on a conveyor, which comprises a first and a second rotor located side by side and driveably connected for rotation in the same sense, each rotor comprising a plurality of series of pins axially placed along the rotor, the rotors being placed so that on rotation the series of pins on one rotor comb the series of pins on the other rotor (i.e. the series of pins on the two rotors being intercolated in the zone between the rotors) and means adapted to co-operate with the rotors to carry material off the conveyor and into the zone between the two rotors.

The powder, particulate or granular material may be of any type desired, but may be in particular a pharmaceutical composition. Suitable pharmaceutical compositions include powdery compositions destined for administration by inhalation, for example a powdery composition containing a suitable chromone-2-carboxylic acid or a pharmaceutically acceptable derivative thereof, e.g. the disodium salt of 1,3-bis(2-carboxychromon-5-yloxy)-propan-2-ol.

The conveyor may be of a conventional design and is preferably a rotating annular trough.

The series or rows of axially spaced pins are preferably evenly spaced around the rotor. The rows may conveniently be placed linearly along the axis of the rotor or may be placed spirally around the rotor. There should be not less than two, and generally for convenience not more than about 10 series of pins. It is preferred to have four series of pins. The pins are for convenience mounted radially, the pins may be rigid and spaced along the axis of the rotor at intervals which will vary with the material (and the agglomerates therein) on which it is intended to use the device. For use with a powdery pharmaceutical composition a spacing of from about 0.2 to 2mm between neighboring pins on different rotors is in general suitable. The pins may be of any convenient cross section, but they are preferably of circular cross section. For use with finely divided pharmaceutical compositions it is preferred that the pins be of as small a cross section as possible commensurate with adequate strength, thus for example pins of circular cross section may have a diameter of about 1.5 mm. The pins may also be pointed at their extremities. The rotors may be such as to be driven by a conventional power means, e.g., by electric motor, gears, or by belt or chain drive. It is preferred that each series of pins on the second rotor has one more pin than each series of pins on the first rotor so that the second rotor carries the two pins nearest the sides of the conveyor thus ensuring that any material carried up by the first rotor is carried down again by the second rotor. If desired three or more rotors may be used the third rotor being arranged so that it series of pins comb (intercolate) the series of pins on the second rotor, and so on. Alternatively more than one device comprising a pair of rotors may be used at different positions on the conveyor.

The means adapted to co-operate with the rotor to carry the material up off the conveyor into the zone between the two rotors may comprise a wedge or concave shaped member situated just clear of the conveyor (so as to allow free movement of the conveyor) and just below and on the downstream side of the first rotor the narrow edge of the member being upstream of the broader edge and the surface of the member conforming substantially to the arc described by the ends of the series of pins of the first rotor.

The first rotor is to be driven so that motion at the lower end of the pins is in the same sense as (and preferably at a slightly greater speed than) the motion of the material on the conveyor. The second rotor is to be driven so that its rotation is in the same sense as that of the first rotor. It is preferred that the second rotor be driven faster; and preferably about 1.5 times as fast as the first rotor, thus causing the material to be thrown downwards out of the zone between the two rotors faster than it is introduced into the zone.

The device is intended to fit over the conveyor. In operation the powder, particulate or granular material is fed onto the conveyor, preferably by a vibratory feeder. The material is then transported by the conveyor to the device where substantially all of the material is carried up by the first rotor, and into the zone between the two rotors, and then brought down again, with a form of milling taking place in the zone between the intermeshing pins. The material then passes back onto the conveyor and thence to the capsule filling area. The material on the conveyor may be subjected, either before or after passage through the device to other conventional levelling or smoothing operations, e.g., passage under one or more scraper blades, which may be either at an angle, or perpendicular to the direction of movement of the material on the conveyor.

Accordingly a further feature of the invention comprises a process for breaking up agglomerations of powder, particulate or granular material which are being carried on a conveyor, which comprises subjecting the material being carried on the conveyor to a milling section. The milling is preferably carried out slightly above the conveyor between two rotors each comprising a plurality of axially spaced series of pins, the series of pins on one rotor combing the series of pins on the other rotor and the two rotors being rotated in the same sense.

The invention will be further described with reference to the accompanying drawings, in which like numerals denote like parts and in which.

Figure 2:
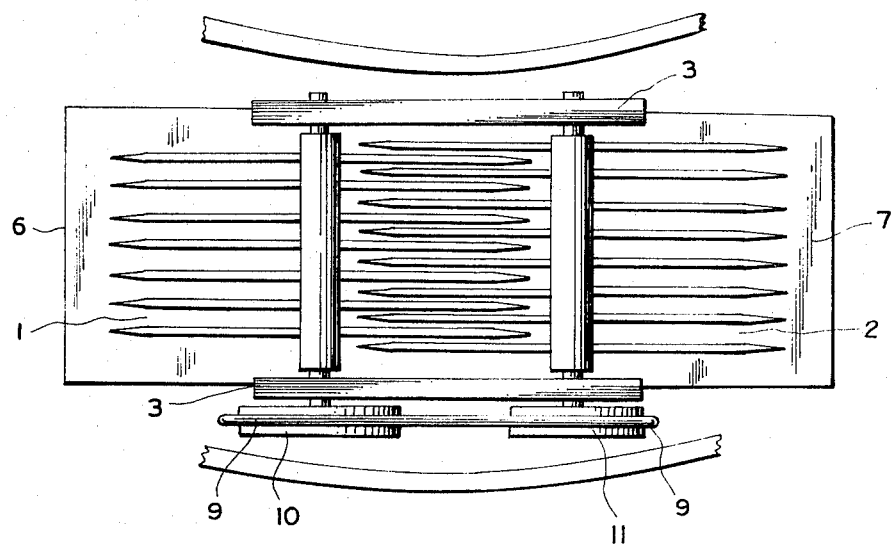
FIG. 2 is a plan view of the device of FIG. 1.
Figure 1:
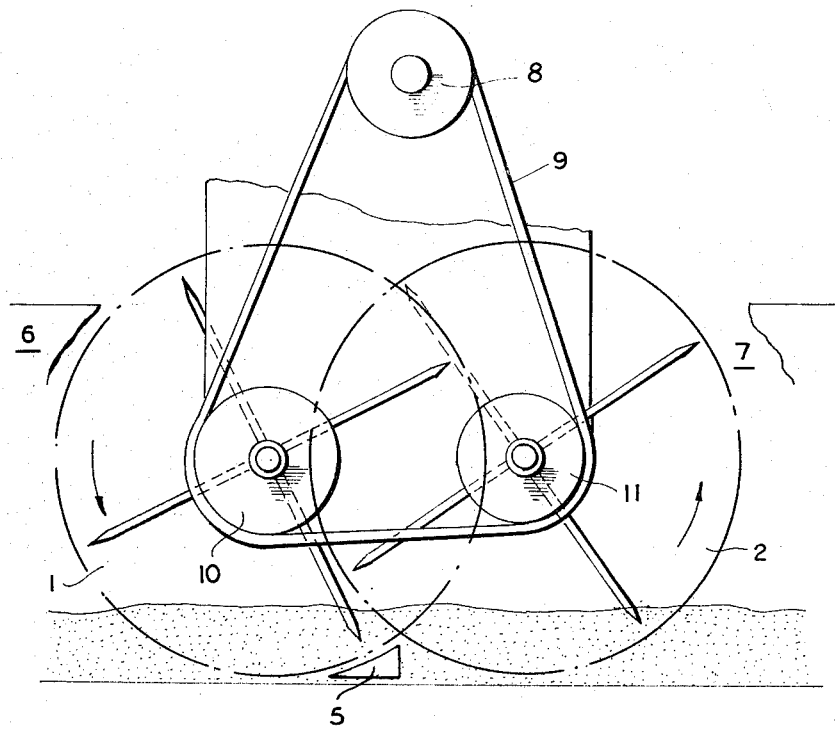
FIG. 1 is a side elevation of a preferred embodiment of device according to the invention shown in conjunction with powder material travelling in a trough.
Figure 3:
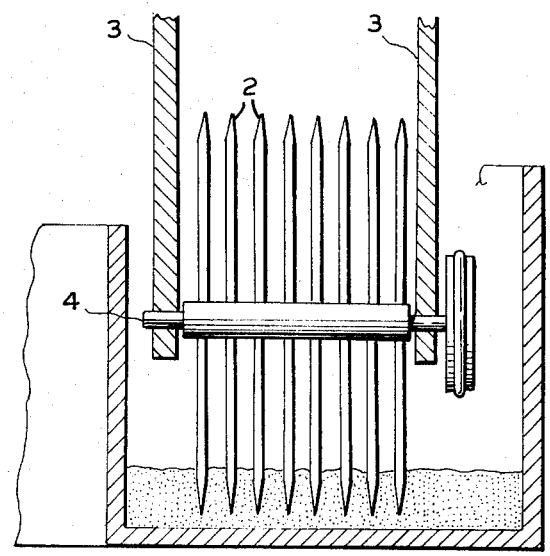
FIG. 3 is an end elevation of the device, shown partly in section.

Two rotors 1 and 2, each consisting of stainless steel pins fitted into a horizontal spindle, are held by side plates 3 in bushes 4 so that, as they rotate, the pins of the one pass between the pins of the other. In the meshing region between the rotors agglomerations of powder are broken down by the interaction of the pins. A horizontal plough blade, 5, ensures that powder is lifted into the agglomeration-breaking zone, and shrouds 6 and 7 prevent powder being thrown out by the rotating rotors. The wheels are driven in the same direction at different speeds by an electric motor 8 by a belt 9 and pulleys 10 and 11 mounted on the spindles, and the pulleys and belt drive are shrouded in a case (not shown) to prevent their being clogged by the powder.

The rotation of the rotor is desirable to assist the passage of the powder through the device as well as to cause the milling effect. To the former end the downstream wheel is caused to rotate faster than the upstream wheel, and the speed of rotation of the motor is controlled by a regulator (not shown) so that the linear tangential velocity of the tips of the pins on the downstream wheel at their lowest point is equal to, or greater than, the linear velocity of the powder in the trough.

The entire assembly is carried on two horizontal bars by bolts in slots to allow accurate positioning, and may be mounted above and in the trough by any suitable support frame.

Although designed and exemplified for use on a capsule-filling machine of a specific type, it will be seen that the device is applicable in any situation where a particulate or granular material is travelling on a conveyor belt or moving platform, and where it is desired to agitate, mix, tumble or mill the material as it travels, without removing it from the platform or causing any hindrance to its passage.

Various modifications may be made within the scope of the invention.

I claim:

1. A device for the agitation, mixing, tumbling or milling of a powder, particulate or granular material or for breaking up agglomerations of powder, particulate or granular material, on a conveyor, which comprises a first and a second rotor located side by side and driveably connected for rotation in the same sense, each rotor comprising a plurality of series of pins axially spaced along the rotor, the rotors being placed so that on rotation the series of pins on one rotor comb the series of pins on the other rotor, and means adapted to co-operate with the rotors to carry material off the conveyor and into the zone between the two rotors, said means comprising a wedge or concave shaped member situated just below and on the downstream side of the first rotor, the narrow edge of the member being upstream of the broader edge.

2. A device according to claim 1, wherein the series of axially spaced pins are evenly spaced around each rotor.

3. A device according to claim 1 wherein each rotor comprises not more than 10 series of pins.

4. A device according to claim 1, wherein the pins are radially mounted.

5. A device according to claim 1, wherein the second rotor carries one more pin than the first rotor.

6. A device according to claim 1, wherein the surface of said member conforms substantially to the arc described by the end of the series of pins on the first rotor.

7. A device according to claim 1 in combination with a conveyor.

8. A device according to claim 1, further comprising means for rotating said first rotor so that motion at the lower end of the pins thereof is in the same sense as, and preferably at a slightly greater speed than the motion of the material on the conveyor, and for rotating the second rotor faster than and in the same sense as the first rotor.

9. A process for breaking up agglomerations of powder particulate or granular material which are carried on a conveyor, said process comprising moving said material along said conveyor into contact with a first rotor having a series of pins axially spaced therearound, rotating said first rotor to cause said pins to agitate and move said material in the direction of said rotation, rotating a second rotor having a series of pins axially spaced therearound such that the pins of said second rotor comb the pins of said first rotor, lifting said material away from said conveyor along a curved surface in the zone between said two rotors, whereby said material is agitated and moved downwardly toward said conveyor by said second rotor.

10. A process as claimed in claim 9, wherein said second rotor is rotated in the same sense as and at a higher speed than said first rotor.

* * * * *